United States Patent [19]

Claussen et al.

[11] 4,401,729

[45] Aug. 30, 1983

[54] HIGH-STRENGTH CERAMIC LAMINATED TUBE AND THE PRODUCTION AND USE THEREOF

[76] Inventors: Nils Claussen, Brandenburger Strasse 13, D-7250 Leonberg 7; Günter Petzow, Tannenweg 7, D-7022 Leinfelden-Echterdingen 1, both of Fed. Rep. of Germany

[21] Appl. No.: 6,836

[22] Filed: Jan. 25, 1979

[30] Foreign Application Priority Data

May 17, 1978 [DE] Fed. Rep. of Germany ..... 28215954

[51] Int. Cl.³ .................... F41F 17/08; F41F 17/06
[52] U.S. Cl. .................... 428/623; 428/627; 428/630; 428/632; 428/633; 428/450; 428/446; 428/454; 428/471; 428/472; 428/75; 89/16
[58] Field of Search ............... 428/623, 627, 586, 136, 428/75, 450, 471, 472, 446, 454, 630, 632, 633; 42/76 A; 138/140, 141, 142, 143, 144, 145, 146; 308/238, DIG. 8; 89/16

[56] References Cited

U.S. PATENT DOCUMENTS

| | | | |
|---|---|---|---|
| Re. 23,976 | 4/1955 | Kistler | 138/141 |
| 2,137,259 | 11/1938 | Boak | 89/16 |
| 2,308,473 | 4/1943 | Wadman et al. | 138/141 |
| 2,609,631 | 9/1952 | Garand | 89/16 |
| 2,640,503 | 6/1953 | Milligan et al. | 138/141 |
| 3,284,144 | 11/1966 | Moore et al. | 308/238 |
| 3,523,035 | 8/1970 | Whitlow | 42/76 A |
| 3,568,723 | 3/1971 | Sowards | 138/143 |
| 3,714,971 | 2/1973 | Venable, Jr. | 138/143 |
| 3,742,640 | 7/1973 | Thomsen | 42/76 A |
| 3,788,820 | 1/1974 | Hunt | 428/586 |
| 3,866,306 | 2/1975 | Korsell et al. | 428/586 |
| 3,877,272 | 4/1975 | Brunossum | 428/586 |
| 3,919,755 | 11/1975 | Kaneko et al. | 138/143 |
| 4,075,926 | 2/1978 | Eriksson et al. | 89/16 |
| 4,082,863 | 4/1978 | Domey et al. | 138/146 |

FOREIGN PATENT DOCUMENTS

| | | | |
|---|---|---|---|
| 2356616 | 5/1974 | Fed. Rep. of Germany | 308/8 |
| 7213326 | 4/1973 | Netherlands | 308/238 |

*Primary Examiner*—Brooks H. Hunt

[57] ABSTRACT

A high-strength ceramic laminated tube comprising an inner tube of ceramic material and at least one outer tube of a metal or ceramic material shrunken onto the inner tube is provided, e.g., a ceramic tube capable of withstanding the mechanical stresses which occur in, e.g., a gun barrel, or in a bearing subjected to great stress.

9 Claims, 1 Drawing Figure

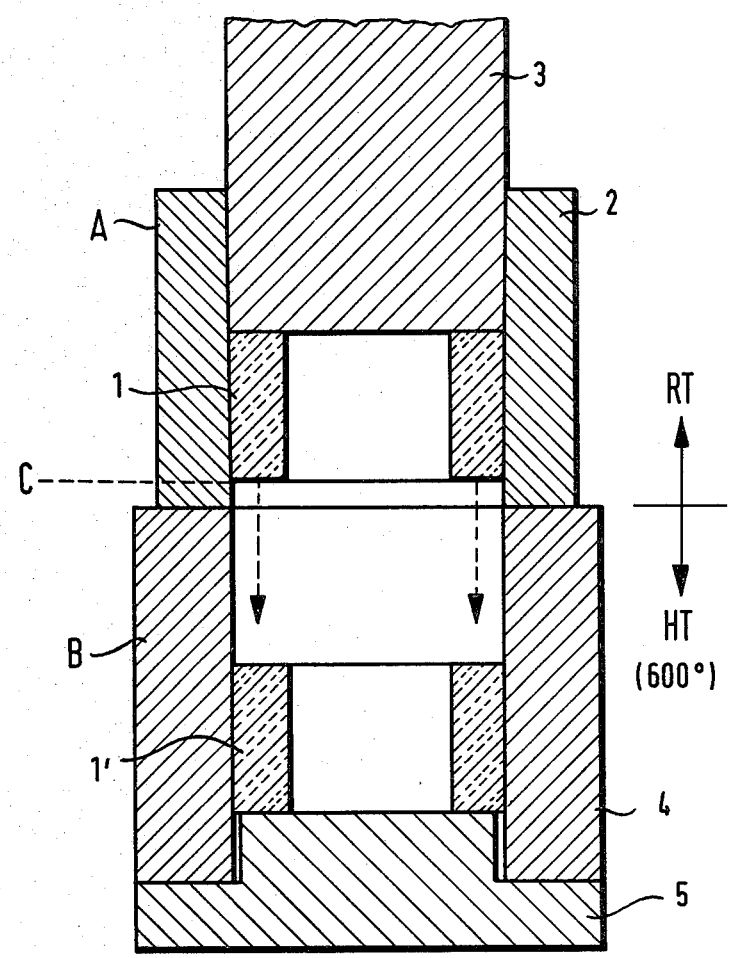

HIGH-STRENGTH CERAMIC LAMINATED TUBE AND THE PRODUCTION AND USE THEREOF

BACKGROUND

The invention relates to a high-strength ceramic laminated tube, to a method of manufacturing it, and its use.

Ceramic material is characterized by good refractoriness and resistance to abrasion and corrosion. However, insufficient mechanical strength, especially brittleness and correspondingly low tensile strength and low thermal shock resistance, are often an obstacle to the technical exploitation of these advantageous properties. Tubes of ceramic materials are therefore unsuitable for applications in which high tangential tensile strains can occur.

THE INVENTION

The invention provides a high-strength ceramic tube which makes possible the full utilization of the above-mentioned advantageous properties of ceramic material even when severe stresses or tensile strains and high internal pressures are involved. In particular, a ceramic tube is provided which is capable of withstanding the mechanical stresses which occur in the tube of a firearm, e.g., a gun barrel, or in a bearing subjected to great stress.

Essentially, the invention provides a ceramic laminated tube having an inner tube of ceramic material and at least one outer tube of metal or ceramic material shrunken onto the inner tube. In the ceramic laminated tube of the invention, the shrinkage tension of the outer tube largely or completely compensates for the brittleness of the ceramic of the inner tube, i.e., its sensitivity to thermal shock and mechanical shock, and its low tensile strength (amounting to only about one-tenth of its compressive strength). The stress range resulting from internal pressure and thermal stress is in this manner shifted into the range of the compressive strength of the ceramic.

In the ceramic laminated tube of the invention, the oversize of the inner tube, i.e., the difference between the outside radius of the inner tube and the inside radius of the outer tube at normal pressure determines the tensile pressure (shrinkage pressure) that is exerted on the inside tube, which produces a prestress on the inside of the tube.

By the appropriate choice of the materials of the outer tube and inner tube, laminated tubes can thus be created which are capable of performing the wide variety of tasks in which the above-mentioned advantageous properties of a ceramic material are to be utilized. In a preferred embodiment of the invention, the outer tube consists of a plurality of concentric metal and/or ceramic tubes. In the case of an outer tube composed of a plurality of metal tubes shrunken concentrically on one another, it is possible to increase the shrinkage tension substantially for the same outer tube thickness, as compared with a metal outer tube of corresponding thickness consisting of one layer of metal.

Since in the case of an outer tube of metal the shrinkage tension decreases as the temperature of the entire ceramic laminated tube increases, on account of the higher thermal expansion coefficient of the metal in comparison to the ceramic, it is possible in an outer tube composed of a plurality of concentric metal tubes, by the use of metals of different thermal expansion coefficients for the individual tubes composing the outer tube, to reduce the thermal expansion and hence to counteract the loss of the shrinkage tension.

In a preferred embodiment, at least one thermal insulation layer is disposed between the different metal tubes of the outer tube. Such an insulation layer also leads to the maintenance of a higher shrinkage pressure when the laminated tube becomes heated. The thermal insulation layer can consist of a number of appropriate materials, such as a layer of asbestos or a ceramic layer. In the latter case, the ceramic laminate tube can consist, for example, of a ceramic inner tube, and of an outer tube which in turn consists of several tubes drawn concentrically one over the other, whose material from the inside out is alternately metal, ceramic, metal, and so on.

Steel is the preferred metal in the scope of the invention, especially when the ceramic laminate tube is to be used for firearm barrels. Since the strength of the laminated tube in this case is determined by the hot elastic limit of the steel, which is on the order of 1000 to 3000 $MN/m^2$, such laminated tubes have a prestress and hence an ultimate strength of the entire combination which is entirely sufficient for the temperatures occurring in firearm barrels. For other applications, in which still higher temperatures can occur, the outer tube can best consist of a superalloy or TZN alloy (molybdenum). Other metals, too, can be used, depending on the application involved.

The outer tube, however, can also consist of one or more concentric ceramic tubes. In such a ceramic-ceramic laminated tube, it is possible to use ceramics having different expansion coefficients, so that, as the temperature increases, the shrinkage pressure will not decrease, as in a metal outer tube, but increase. Thus, in the case of an inner tube of magnesium oxide having an expansion coefficient $\alpha = 13 \times 10^{-6}/K$ and an outer tube of silicon nitride, $\alpha = 3 \times 10^{-6}/K$, as the temperature increases and as the stress increases, the pressure on the MgO inner ring can increase on the basis of this difference between the coefficients of thermal expansion. Outer tubes of metal can be used in addition to the ceramic tubes.

In another preferred embodiment of the invention, the inner tube and the outer tube consist of the same material. In this manner an "isomorphous" or "isostructural" laminar construction is obtained, in which no stress changes occur as the temperature increases. The maximum hazardous tensile stress on the inside, which could quickly lead to fracture if injuries are present, are thus shifted to the protected boundary surface between the two tubes. Such a method of construction is especially suitable for bearing sleeves in which the ceramic laminated tube is short, i.e., can be regarded as a ring. Such ceramic laminated rings in accordance with the invention are suitable especially for bearings subject to high stress, in ceramic turbines and other such heat engines, which are exposed to especially high temperatures.

The material of the ceramic inner tube can be selected by the person skilled in the art from among the ceramic materials available, according to the characteristics required as regards corrosion resistance, abrasion resistance, resistance to thermal shock, and the like. Preferred, in the scope of the invention, are ceramic materials which are based on or consist of $Si_3N_4$, $Al_2O_3$, $SiC$, $MgO$ or $ZrO_2$.

If resistance to abrasion is of paramount importance, aluminum oxide, silicon nitride and silicon carbide or materials based on these compounds are appropriate. If, however, it is chemical resistance that is most important, an inner tube of MgO, ZrO$_2$ or, in some cases, Al$_2$O$_3$, will be chosen. Chemical resistance is especially important if the laminated tube in accordance with the invention is to be used for chemical reactor tubes or reactor vessels which are exposed to highly corrosive substances and at the same time must withstand high pressures and temperatures.

An important advantage of the ceramic laminated tube of the invention consists in the great symmetry of the tensile pressure exerted on the inside tube. This symmetry is all the better the smoother the outer surfaces of the joined tubes are. It is therefore desirable for the inner tube to have a polished outside surface and for the outside tube to have a correspondingly polished inside surface. Polished and therefore especially smooth surfaces also facilitate the drawing together of the heated outer tube and cooler inner tube in the manufacture of the ceramic laminated tube.

If the outer tube consists of metal, axial tensile strains also occur when it is heated, since the outer tube also expands more greatly lengthwise than the ceramic inner tube. Therefore, in order to prevent the formation of radial cracks in such laminated tubes, it may be desirable to divide the ceramic inner tube into a plurality of shorter tubular sections. Thus it has proven advantageous, for example, in a gun barrel material of this kind, to build up the ceramic inner tube from tubular sections of approximately 20 to 50 centimeters length. The length of such tubular sections will depend both on the material of the individual layers of the laminated tube and on the intended application and the stresses occurring therein, and therefore it can be substantially beyond the range stated above for gun barrels. If, for example, the lining of the barrel consists of aluminum oxide, the tubular sections can be longer than in the case of silicon nitride whose thermal expansion amounts to only about one-third that of aluminum oxide, and which also has a lower elastic limit and compressive strength.

The method of the invention for the production of the ceramic laminated tubes described above is characterized by the rapid insertion of a ceramic inner tube, whose outside radius is from 1 to 10% oversized with respect to the inside radius of the outer tube which is heated at least until the oversize is compensated by thermal expansion, followed by the shrinking on of the outer tube by cooling.

If the outer tube consists of steel, the ceramic inner tube becomes hot when it is inserted into the heated steel jacket, and expands, while the steel jacket cools and shrinks. On account of the oversize of the inner tube, the shrinkage pressure will persist even after the laminated tube cools. It is easily understood that the shrinkage pressure will depend on the oversize of the inner tube. Since when the laminated tube is heated, the steel outer tube will expand more than the ceramic inner tube, the shrinkage pressure will diminish. The oversize of the inside tube is therefore selected on the basis of the anticipated temperature stresses. Furthermore, it must be assured that the friction between the inner tube and outer tube upon heating will remain great enough to prevent the inner tube from being forced out of the outer tube by axial stress. On the other hand, the oversize must not be so great that the hot elastic limit of the jacket material will be exceeded, since the jacket material can be expanded elastically and the maximum shrinkage pressure maintained only up to the elastic limit. Therefore, in the case of steel as the jacket material, an oversize of 1 to 4 per mil is preferred, and when the inner tube is inserted, the temperature of the outer tube is to be no more than the drawing temperature used in tempering the steel, so as to prevent any impairment of the mechanical characteristics of the steel.

The thickness of the tube also depends both on the material and on the intended application. For a given application, the inner tube can have a smaller wall thickness, if it consists of a high-strength ceramic such as aluminum oxide, as compared with a lower-strength ceramic such as, for example, reaction bound silicon nitride (RB-Si$_3$N$_4$).

To prevent excessive heating of the outer tube of steel or other such metal, with the danger of impairment of its properties, it is preferable to make the clearance needed for the bonding together of the inner and outer tubes as small as possible. For this purpose it is advantageous on the one hand to grind the tubes precisely round and cylindrical, and on the other hand the guidance of the tubes beng bonded must be precisely parallel, so that the tubes will not become cocked when they are assembled. Furthermore, the shrink fitting must take place so rapidly that the cooling of the steel jacket and the heating of the ceramic tube will remain slight and the radial changes associated therewith will be smaller than the clearance between the two tubes.

A preferred embodiment of the method of the invention for the production of a ceramic laminated tube will now be described in conjunction with the appended drawing. The outer tube 4 which is to be shrink fitted is on a centering disk 5 whose stud-like projection extends into the tube 4. Tube 4 and centering stud 5 are together brought to the desired temperature of, for example, 600° C. Then the device A is centered over the tube 4. Device A consists of a downwardly narrowing metal ring 2 which grips the ceramic tube 1 in position C. Above the inner tube 1 there is a weight 3. The parts composing device A are at room temperature at the time of placement on tube 4. Due to the passage of heat from 4 to 2, the latter expands slightly, so that the inner tube 1 becomes free and is driven into tube 4 by the weight 3. The downward movement is limited by the centering stud 5, and the ceramic inner tube 1 is immediately held fast by the cooling of the outer tube 4.

It is evident to the man skilled in the art that this procedure can be varied in many ways. For example the tapered metal ring 2 can also be heated by a separate means, especially if the outer tube 4 itself is a ceramic material which yields heat slowly to the metal ring 2, and the weight 3 can be replaced by other pressure-producing means.

As already mentioned, the ceramic laminated tube of the invention is generally suited for applications in which the mechanical strength of a ceramic tube is insufficient. In particular, such ceramic laminated tubes are suitable when they have an outer tube composed of one or more steel jackets, as wear-resistant barrels for firearms. Furthermore, they are suitable, in the form of metal-to-ceramic laminates or ceramic-to-ceramic laminates, for heavy duty bearings, especially, and generally, for applications in which high pressures are encountered simultaneously with corrosive conditions and possibly also high temperatures—especially, therefore, in the construction of reactors and in the chemical industry.

EXAMPLES

The following examples will further explain the invention:

EXAMPLES 1-5

Ceramic laminated tubes were produced having outer tubes of steel types VCN 200 and USU 2 and inner tubes of $Al_2O_3$ and $RB-Si_3N_4$, respectively. The inside diameter of the ceramic tubes was 18.0 mm, the outside diameter 23.0 mm in the case of $Al_2O_3$ and 25.0 mm in the case of $RB-Si_3N_4$. The outside diameter of the steel tubes was 48.0 mm, and the inside diameter 23.0 and 25.0 mm, respectively, depending on the ceramic material. The steel tubes were shrunk onto the ceramic tubes with the aid of the device represented in the drawing. The shrinking temperature and the oversize of the various combinations are shown in the following table:

| Example | Material combination | Shrinking temperature | Permillage of diameter oversize |
|---|---|---|---|
| 1 | VCN 200 with $Al_2O_3$ | 600° C. | 0.43 |
|   |   |   | 2.6 |
|   |   |   | 4.3 |
| 2 | VCN 200 with $Al_2O_3$ | 500° C. | 0.43 |
|   |   |   | 2.6 |
|   |   |   | 4.7 |
| 3 | VCN 200 with $RB-Si_3N_4$ | 500° C. | 4.7 |
| 4 | USU 2 with $Al_2O_3$ | 500° C. | 3.9 |
|   |   |   | 4.1 |
|   |   |   | 4.4 |
| 5 | USU 2 with $RB-Si_3N_4$ | 500° C. | 3.9 |
|   |   |   | 4.1 |

On the laminated tubes thus prepared, the shrinkage pressure, the shrinkage force, the friction, and the force required for the expulsion of the inner tube were measured. The results obtained in relation to the selected oversize are set forth in the following table for the ceramic laminated tube of Example 1.

| Sample | Permillage of diameter oversize | Shrinkage pressure $N/mm^2$ | Shrinkage force* $10^4 N$ | Friction force** | Expulsion force measured, $10^4 N$ |
|---|---|---|---|---|---|
| 1 | 0.43 | 40 | 7.1 | 2.1 | 3.6 |
| 2 | 2.6 | 240 | 43 | 13 | 32 |
| 3 | 4.3 | 400 | 71 | 21 | 32 |

*Dimensions of ceramic tube: inside diameter 19.5 mm, outside diameter 23 mm, length 25 mm.
**Coefficient of friction $\mu = 0.3$ Samples 2 and 3 could not be expelled, because the steel plunger with which the pressure was exerted on the ceramic tube began to deform. They are therefore suitable also for withstanding severe axial thrust.

The ceramic laminated tubes of the combination of VCN 200 with $Al_2O_3$, which were shrink fitted with an oversize of 4 per mil or more, withstood an internal pressure of up to at least 6000 bars.

In the case of the VCN 200-$Si_3N_3$ combinations, an internal pressure of up to 5000 bars was withstood without cracking or other recognizable harm.

In the corresponding combinations with USU 2, an internal pressure of up to 4000 bars was withstood without harm.

It will be understood that the specification and examples are illustrative but not limitative of the present invention and that other embodiments within the spirit and scope of the invention will suggest themselves to those skilled in the art.

We claim:

1. High-strength ceramic composite tube comprising an inner tube of ceramic material and at least one outer tube of a metal or ceramic material shrunken onto the inner tube to yield a compressive stress of at least 680 MPa.

2. Ceramic laminated tube as claimed in claim 1 wherein the outer tube consists of several concentric tubes.

3. Ceramic laminated tube as claimed in claim 2 wherein there is at least one thermal insulating layer between the concentric tubes.

4. Ceramic laminated tube as claimed in claim 1 wherein the outer tube is of metal and the metal is steel.

5. Ceramic laminated tube as claimed in claim 1 wherein the ceramic material is of $Si_3N_4$, $Al_2O_3$, SiC, MgO and/or $ZrO_2$.

6. Ceramic laminated tube as claimed in claim 1 wherein the inner tube consists of several tube sections.

7. Ceramic laminated tube as claimed in claim 1 wherein the inner and outer tubes consist of the same material.

8. Firearm barrel comprising a ceramic laminated tube as claimed in claim 1.

9. Water-resistant bearing comprising a ceramic laminated tube as claimed in claim 1.

* * * * *